United States Patent [19]
Streit

[11] 3,872,894
[45] Mar. 25, 1975

[54] LIGHT WEIGHT CABLE HOUSING
[75] Inventor: Kenneth F. Streit, Mount Prospect, Ill.
[73] Assignee: 3-D Ducts, Inc., Hillside, Ill.
[22] Filed: Oct. 3, 1973
[21] Appl. No.: 403,248

[52] U.S. Cl................. 138/155, 138/117, 138/177, 285/137 R, 285/230
[51] Int. Cl.............................................. F16l 9/22
[58] Field of Search ........... 138/115, 117, 155, 162, 138/163; 285/137 R, 416, 363, 364, 368, 347, 405; 174/95

[56] References Cited
UNITED STATES PATENTS
| | | | |
|---|---|---|---|
| 3,163,448 | 12/1964 | Franklin | 285/230 |
| 3,545,493 | 12/1970 | Freeman | 138/115 |
| 3,792,878 | 2/1974 | Freeman | 285/137 R |

FOREIGN PATENTS OR APPLICATIONS
2,110,201  3/1970  Germany ........................... 138/155

Primary Examiner—Henry K. Artis
Assistant Examiner—James E. Bryant, III

[57] ABSTRACT

Conduit sections are connected end to end and buried in the ground, with each section including multiple partition walls that divide the interior of the conduit section into extended, sealed support passages for cables. The partition walls each include an inclined projection at one end of each conduit section and a correspondingly inclined recess at the other end of each section to allow interlocking telescopic mating of partition walls of adjacent sections. The inclined projections and recesses provide mutual surface to surface reinforcement to support the joint between sections against shear loading.

19 Claims, 7 Drawing Figures

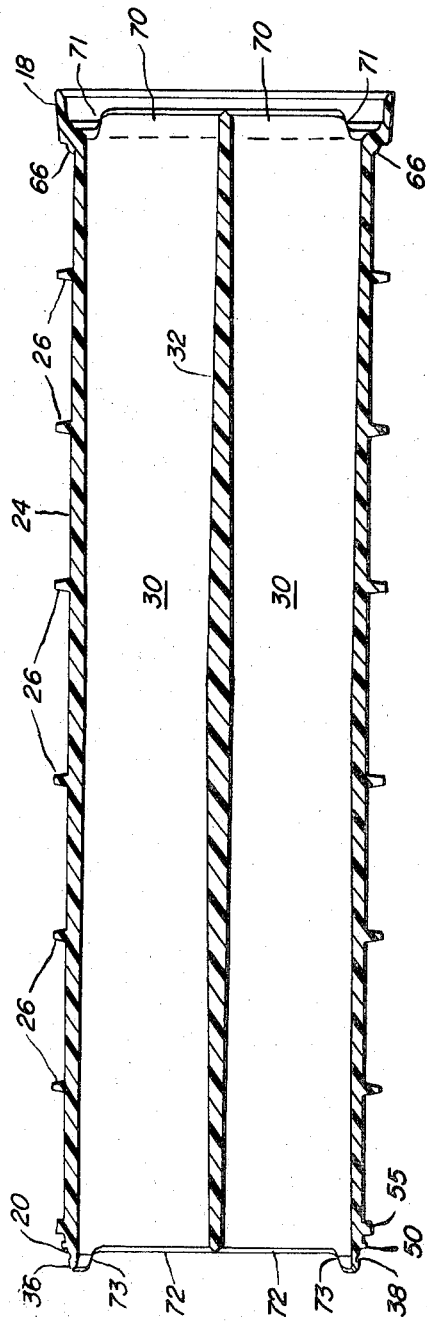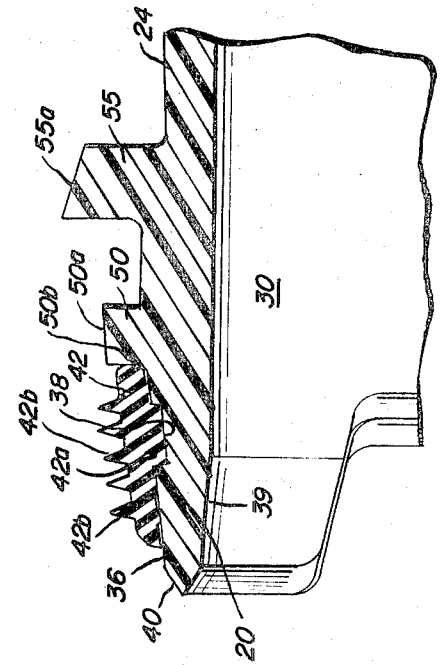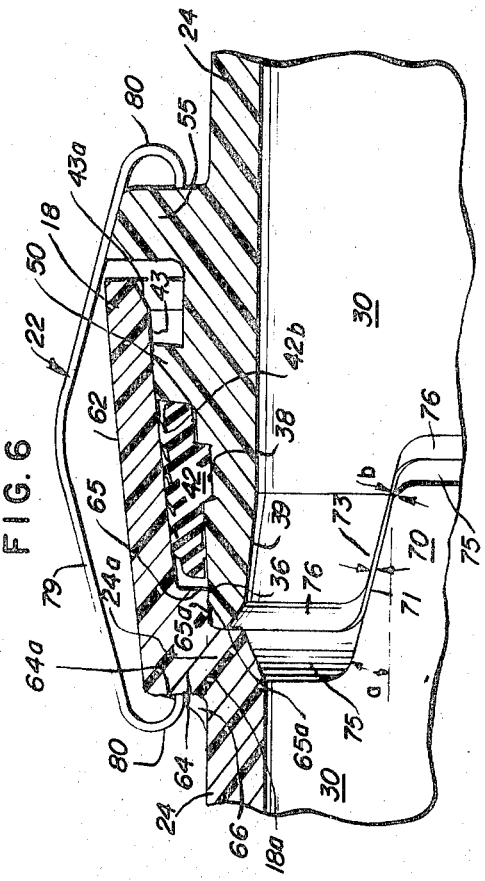

LIGHT WEIGHT CABLE HOUSING

BACKGROUND OF THE INVENTION

This invention relates to conduit sections and more particularly to multipassage conduit sections that are connected end to end and buried in the ground to provide a protective housing about a plurality of cables extending through the conduit sections.

With the increasing use of transmission lines, such as telephone and telegraph cables, computer data lines and cable television, as well as public protestations against above ground transmission towers, underground burial of cables has become the expedient used to provide a path for such cables. The use of buried conduit sections to provide cable passages not only overcomes public dissatisfaction with above ground installations, but also provides an economical way of expanding capacity without a great increase in capital costs required by erecting new transmission towers or gaining access to new rights of way. By initially installing conduit sections having capacity above the present requirements, the excess conduit passages may be used for later growth by merely drawing new cables therethrough.

Several cable conduits have been proposed in the past, such as those disclosed commonly assigned U.S. Pat. No. 3,545,493 and copending, commonly assigned U.S. patent application Ser. No. 183,884 filed Sept. 27, 1972 now U.S. Pat. No. 3,792,878. The conduits disclosed therein utilize multipassage conduit sections that may be molded from high impact plastic, such as linear polyethylene, and which may be conveniently connected end to end at the construction site to provide a multipassage conduit. While these types of conduits provide adequate protection for the cables, as well as ease of installation of the cables within the conduits, it has been found that the joints between adjacent interconnected conduit sections have not been completely satisfactory under certain rarely occuring, yet troublesome circumstances. Due to ground settling beneath the conduit and shifting of the conduits during backfilling, void areas beneath the conduit, particularly at the joint, have occured. Void areas beneath the joint result in substantial decrease in ground bearing support of the conduit joint. Partition walls within the conduit section outer wall in the above mentioned and other sections function to support the conduit but provide little, if any support for the joint with the result that the female or bell portion of the joint is subjected to substantial shear stress.

With increasing depths of burial and increasing conduit widths greater pressure is presented on the conduit particularly at the joints between adjacent conduits so that increased pressure forces are exerted at the conduit joint. In prior art types of conduits, the shear stress at the joints is supported mainly by the bell of conduit. As the width of the conduit and pressure is increased as by ground loads of heavy vehicles above the conduit, the bell is often over stressed and failures have occurred which may result in damage to conduit integrity and damage to the cables positioned therein.

SUMMARY OF THE INVENTION

A conduit section according to the present invention utilize enclosing walls having partition walls which project outwardly at one end and are correspondingly recessed at the opposite end so that interlocking mating between adjacent similar sections may take place to provide column-like support of the joint rather than planar vertical interfacing of the partition walls at the joint, as in prior art conduits.

In the preferred embodiment, the female end of each section is flared outwardly to provide a bell, and portions of the partition walls project into the female portion at the end of each partition wall to provide an inclined projection having a shape complementary to a U-shape. The male end is provided with correspondingly recessed partition wall portions which are surrounded by a tapered wall or spigot for insertion into the female portion of a similar section.

The conduit sections of this invention are molded from a high impact plastic such as linear polyethylene which provides a light-weight construction, as well as ease of manufacture.

In addition to the support provided by the partition walls, reinforcement of the female end is provided by the selective provision of reinforcing gussets on the outer surfaces of the junction between the flared female end and the enclosing walls. The inner surface of the female portion is designed to be supported on the free end of the male portion of a similar conduit section. Additionally, an annular flange is provided at the male end for supporting the free end of the tapered female end of an adjacent section.

An annular sealing gasket is provided on the male end of each section which includes continuous peripheral ribs to form a labyrinth seal at the joint. Connected sections are secured by spring clips to provide resilient biasing of the sections and allows some relative movement therebetween so that the sections may follow the contour of the trench in which they are buried.

DETAILED DESCRIPTION OF A PREFERRED EMBODIMENT

FIG. 5 is a vertical sectional view taken along line 5—5 of FIG. 2;

FIG. 6 is an enlarged partial sectional view of the joint between adjacent conduit sections secured together by a spring clip; and FIG. 7 is an enlarged partial sectional view of the spigot end of a conduit section.

DETAILED DESCRIPTION OF A PREFERRED EMBODIMENT

Figure 1:
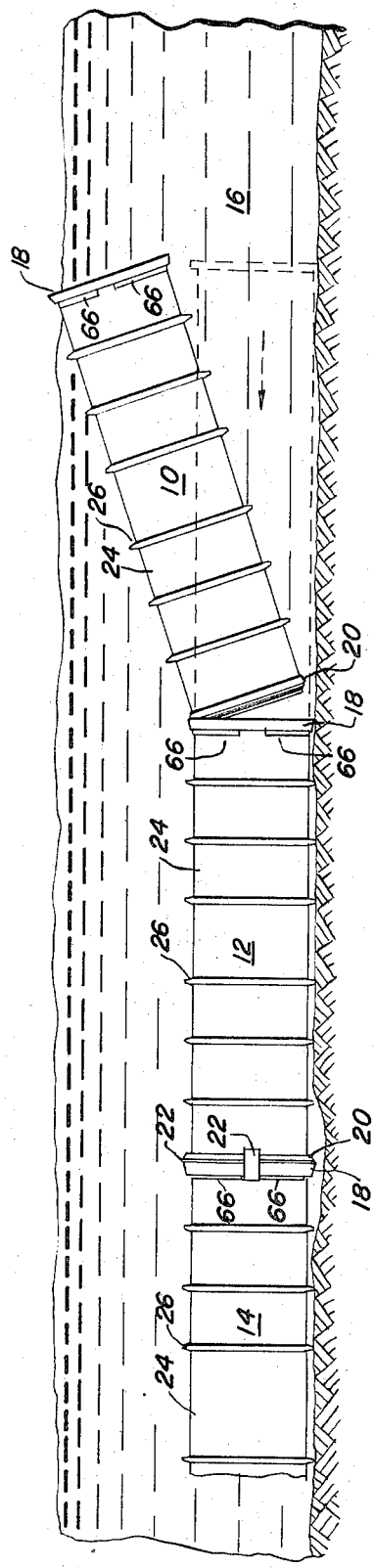
FIG. 1 is an elevation view illustrating the installation of several conduit sections of the present invention in a trench.

While this invention is susceptible of embodiment in many different forms, there is shown in the drawings and will herein be described in detail a preferred embodiment in accordance with the present invention, and with the understanding that the present disclosure is to be considered as an exemplification of the principles of the invention and is not intended to limit the invention to the specific embodiments illustrated and described.

Referring to FIG. 1, a plurality of conduit sections 10, 12, and 14 are positioned in a trench 16 which is excavated in the earth's surface to a depth desirable for burial of cables, such as telephone or telegraph cables. Each conduit section is substantially the same in configuration as the other conduit sections and is preferably made from a high impact plastic, such as linear polyethylene which may be conveniently formed by injection molding.

Each conduit section is provided with a bell or female end 18 and a spigot or male end 20 so that the male end of one conduit section may be inserted into the bell end of an adjacent conduit section. As will be described in greater detail below, adjacent conduit sections are secured together by means of a plurality of spring clips 22 positioned in overlying relationship with the joint between the female end and inserted male end of adjacent conduit sections at spaced locations about the periphery of the joint. Adjacent conduit sections are interconnected by aligning the male and female ends and forcing the male end axially into insertion with the female end, as shown in phantom line in FIG. 1.

Figure 2:
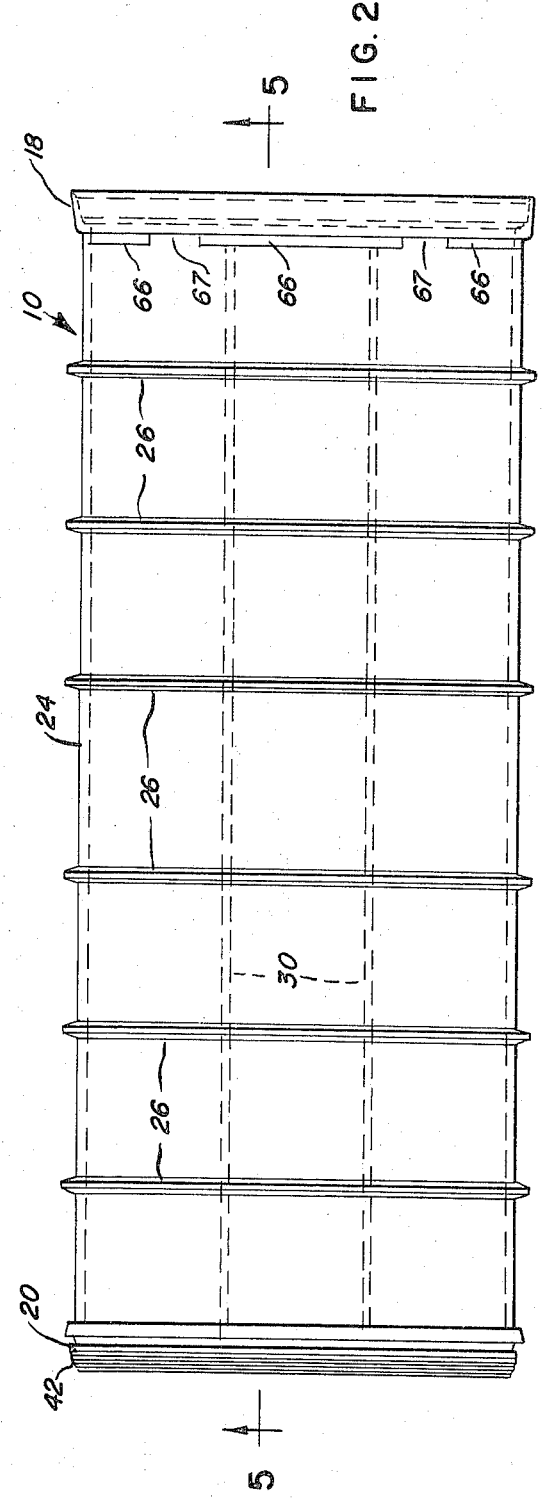
FIG. 2 is a plan view of one of the conduit sections.

One form of the conduit section of this invention is illustrated in FIG. 2, and includes a female end 18 and male end 20 which are formed at the ends of the conduit enclosing walls 24. Enclosing walls 24 define an elongated generally rectangular shaped conduit section which is provided with longitudinally spaced apart, transversely arranged reinforcing ribs 26 which extend completely around the enclosing walls. These ribs 26 reinforce the enclosing walls to prevent collapsing or deformation thereof due to pressures and loads to which the walls may be subjected when the trench in which the conduit is positioned is backfilled and when any additional pressures are generated by ground loadings above the conduit.

Figure 3:
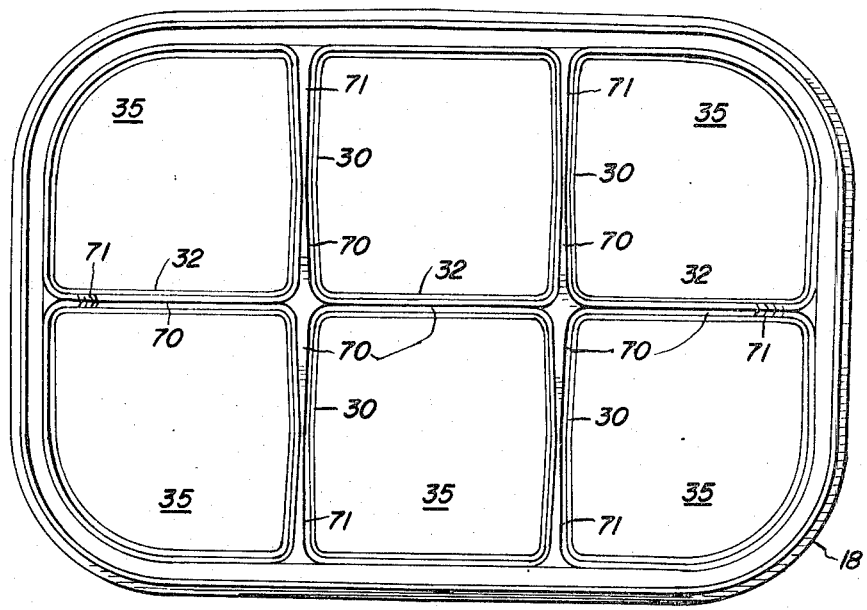
FIG. 3 is an end view illustrating the bell end of a conduit section.

The conduit section is provided with partition walls 30 which extend perpendicularly from the top to the bottom of the enclosing wall 24 and a partition wall 32 formed at right angles to partition walls 30 and extending between the sides of the enclosing walls for dividing the interior of the conduit section transversely into a plurality of longitudinally extending passageways 35, FIG. 3.

Male end 20 of the conduit section is formed by extension of the enclosing walls to provide an outer outwardly tapered surface 36 which includes a continuous annular groove 38, FIG. 7. The inner surface 39 of the male end may also be outwardly flared. The juncture of surfaces 36 and 39 at the free end of the section is tapered to produce a generally triangular shaped end portion having an apex 40 extending outwardly from the section.

An annular shaped, resilient, sealing gasket 42, which may be conveniently formed from neoprene rubber or the like, is positioned on tapered surface 36. The inner surface of gasket 42 adjacent the surface 36 is provided with a continuous rib 42a which is received in groove 38 for securing the gasket thereon. Rib 42a cooperates with surface 36 to provide accurate location of the gasket during installation and effective sealing between adjacently connected conduit sections. The outer and inner surfaces of gasket 42 are provided with a plurality of spaced apart outwardly extending ribs 42b and 42c, respectively, which extend continuously around the periphery of the gasket. As best illustrated in FIG. 6, when the male end of one conduit is inserted into the female end of an adjacent conduit, ribs 42b are forced into engagement with the inner surface 43 of the female end and are deformed thereby, while ribs 42c are forced into engagement with surface 36 and deformed thereby to produce a labyrinth type seal at the joint.

An outwardly extending support flange 50 formed around the periphery of the conduit is provided adjacent groove 38. The transverse dimensions of flange 50 correspond to the transverse dimensions of the female end surface 43 at a given section near the free end thereof so that as the male end is inserted into a similar adjacent conduit section outwardly facing surface 50a of flange 50 bears against surface 43 of the adjacent conduit section to provide support for the free end thereof, as best illustrated in FIG. 6.

Gasket 42 is of sufficient width so that the downstream portion thereof bears against vertical surface 50b of flange 50 so that the flange cooperates with groove 38 to assure proper positioning of the gasket during insertion of the spigot into a bell of an adjacent similar conduit section.

A second flange 55, which extends continuously around the periphery of the conduit, is provided on the enclosing wall 24 at a location spaced from the male end at a distance slightly greater than the depth of insertion of the male end, as will be discussed in greater detail below. Upper surface 55a of flange 55 is tapered at an angle corresponding to the taper of the legs of spring clips 22, discussed below, to facilitating positioning and support of the spring clips when they are installed.

The female end of each conduit section 10 is formed by enlarged outwardly flared portion 18 which may be integrally formed with the enclosing walls at the ends thereof (as indicated at phantom interface 18a). As best illustrated in FIG. 6, female end 18 is defined by two parallel outwardly flared surfaces 43 and 62 which are joined to the enclosing walls 24 by a generally L-shaped angle portion 64. The inner surface 65 of portion 64 forms a generally reversed Z-shaped surface with the end 24a of the enclosing walls at any section to provide an outwardly facing shoulder 65a adapted to limit the insertion of the male end of an adjacent conduit section, and a support surface 65b at the trunk of the Z-shaped surface, whose transverse dimensions correspond to the transverse dimensions of the free end of surface 36 so that surface 65b and angle portion 64 are supported thereon. The free end portion of surface 43 may be flared or tapered, as indicated at 43a to further facilitate insertion of a male end thereon. Outer vertical surface 64a of portion 64 provides an attachement surface for one end of the spring clip 22.

Referring particularly to FIGS. 2 and 6, further support of the female end 18 is provided by gussets 66 at the junction between angle portion 64 and enclosing wall 24 to increase the strength at this junction. Gussets 66 are discontinuous, as best illustrated in FIG. 2, to provide insertion areas 67 for the spring clips 22.

Figure 4:
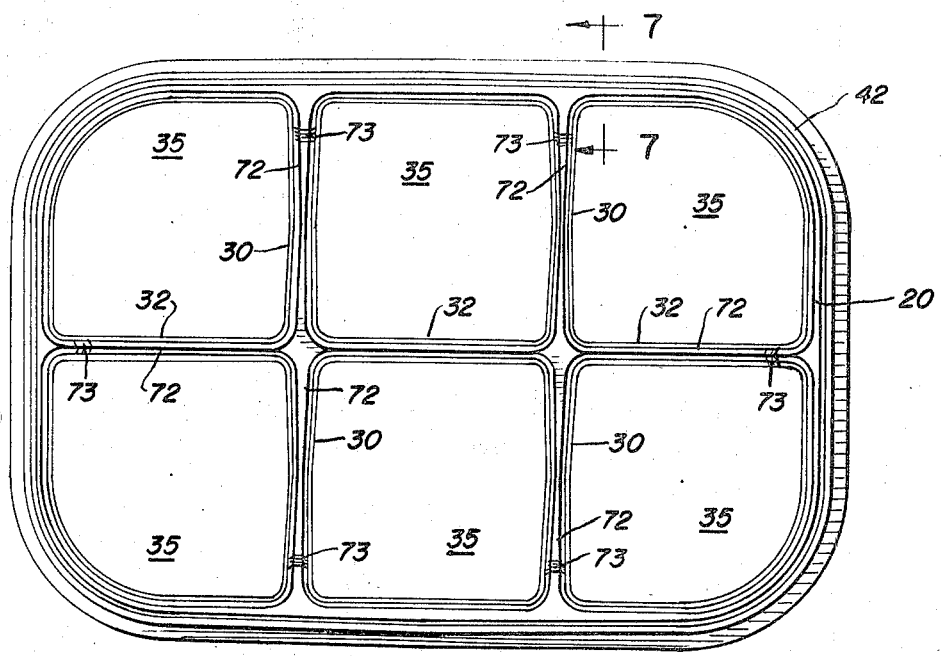
FIG. 4 is an end view illustrating the spigot end of a conduit section.

To provide column-like support at the joint between adjacent similar conduit sections, partition walls 30 project outwardly from the end of the enclosing walls 24 and into the female end of the conduit section to provide inclined projections 70 having a U complement shape. As illustrated in FIG. 6, projection 70 defines an inclined surface 71 at the top leg of the U complement shape which functions as a bearing surface. The angle of incline of each surface 71 from a longitudinal plane normal to the partition wall having the projection, as indicated by a on FIG. 6 should be in the range of about 10° to about 20°, preferably 15°. The partition walls at the male end include a corresponding recess 72 to provide inclined bearing surfaces 73 which are brought into telescopic engagement with surfaces 71 when inserted into an adjacent similar conduit section. In one embodiment, it has been found that a clearance tolerance of 0.010 between surfaces 71 and 73 facilitates telescopic engagement of adjacent similar conduit sections. Partition wall 32 may also be similarly provided with inclined projections 70 and recesses 72 at the female and male ends, respectively, of the conduits, as illustrated more fully in FIG. 3 and 4.

Partition walls 30 increase in thickness outwardly from the mid-portions thereof towards the enclosing walls 24 and partition wall 32. In this manner bearing surfaces 71 and 73 of increased cross-sectional area are provided which better facilitate support of the joint of adjacently connected conduits in column-like fashion.

The outwardly facing free surfaces of partition walls 30 and partition wall 32 are tapered to produce a generally triangular-shaped surface having an outwardly facing apex, as illustrated at 75 and 76, which facilitate in alignment of the passageways 35.

The inclined projections 70 and recesses 72 function as column-like supports for the joint of interconnected conduit sections, and in combinations with support of the female end at surface 65b by the free end of the male end, and at the free end by flange 50 fully support the joint under shear stress loading. The loading absorbed thereby is in effect transferred to the entire conduit since the projections and recesses are cantilevers of the partition walls.

The internal transverse dimensions of the female end 18 of one conduit section are greater than the external transverse dimensions of the male end 20 of the other conduit section so as to accommodate the sealing gasket 42 therebetween, as well as to provide a limited amount of angular displacement between adjacent conduit sections so that the conduits may follow the contour of the ground in which they are buried.

The connected female and male ends of adjacent conduit sections, as illustrated in FIG. 6, are held in assembled relationship by spring clips 22. Each spring clip includes an elongated bent portion 79 which spans the sealed joint between adjacent conduit sections and which is reversely bent at each end, as indicated at 80. As indicated above, the taper of the elongated bent portions corresponds with the angled surface 55a of flange 55 so that the clip is supported thereon. Reversely bent portions 80 engage shoulder flange 55 and surface 64a of the adjacent conduit sections to hold them in assembled relationship. The spring clips 22 are applied, as by hand pressure or by hammering them into place over the sealed joint between the conduit sections with the reverse bends 80 and 81 engaging flange 55 and surface 64a respectively. The resiliency of spring clips 22 not only allows the application of the spring clips to the sealed joints by hammering or the like but also maintains the reverse bent portions 80 in contact with the conduit sections. Additionally, the resiliency of the spring clips allows for a limited amount of angular displacement of the conduit sections while they assume the contour of the trench in which they are buried while still maintaining the seal between the female and male ends of the adjacent conduit sections.

Since the conduit sections of the invention are molded in dies, it is convenient to taper the horizontal partition wall 32 to facilitate withdrawal of the passage forming dies from a finished conduit section, see the above mentioned U.S. patent application. As illustrated in FIG. 5, horizontal partition wall 32 may be formed with a taper extending from the mid-portion of the section to the opposite ends thereof. But it will be understood that the taper may start at other sections within the conduit, e.g., at one end thereof. In this type of structure a single elongated interior die may be utilized since it may easily be withdrawn from the conduit toward the end having the smaller horizontal partition wall thickness. It should also be noted that the partition walls need not be tapered and may be of uniform cross-sectional dimension throughout their length.

While the conduit sections as disclosed utilize partition walls with generally U-shaped inclined projections and recesses it will be readily appreciated that other projections and recess configurations may be utilized without departing from the spirit and scope of the invention, such as multi-stepped and saw-toothed projections and recesses which interlock and mate to provide column-like support for the joint.

I claim:

1. A light-weight, plastic conduit section for connection to similar conduit sections comprising: elongated wall means defining a passage therein; an outwardly tapered male portion at one end of said wall means and integral therewith; means defining a female portion integral with said wall means at the other end thereof to permit insertion of said male portion into a female portion of an adjacent similar conduit section, the outer transverse dimensions of said male portion at the free end thereof being generally equal to the inner transverse dimensions of said female portion at a section opposite the free end thereof for supporting a section of a similar conduit female portion thereon; a flange integral with and spaced from the free end of said male portion, the outer transverse dimensions of said flange corresponding to inner transverse dimensions of a section of said female portion near the free end thereof for supporting the female portion of a similar conduit section on said flange when said male portion is inserted therein; partition walls integral with and extending transversely between said wall means within said passage for dividing said passage into a plurality of longitudinally extending passageways, said partition walls extending outwardly of the end of said wall means and within said female portion defining means to provide integral wall projections having generally U complement shapes with inclined flat bearing surfaces; and the partition walls at said male portion being correspondingly recessed from the end of said wall means, whereby said projections and recesses provide column-like support for the joint between connected similar conduit sections.

2. The conduit section of claim 1 wherein said flange is continuous around said male portion.

3. The conduit section of claim 1 further comprising an annular, resilient sealing gasket carried by the outwardly tapered male portion of said section having its inside face engaging and sealing said outwardly tapered male portion and its outer face engageable with the female portion of an adjacent similar section for sealing engagement therewith.

4. A light-weight, high strength conduit section for connection to similar conduit sections comprising: elongated wall means defining a passage therein; a male portion at one end of said wall means and integral therewith; means defining an integral female portion at the other end of said wall means; and transversely disposed partition walls within said wall means and integral therewith for dividing said passage into longitudinally extending passageways, integral portions of said partition walls projecting outwardly of said wall means at a first end thereof and being correspondingly recessed at a second end thereof, whereby complementary partition wall projecting and recessed portions of adjacent similar conduits may be interlockingly mated to provide column-like support at the joint therebetween.

5. The conduit section of claim 4 wherein said recessed partition wall portions define generally U-shaped recesses having legs defining inclined bearing surfaces and said projecting partition walls are complementary to said recesses.

6. The conduit section of claim 5 wherein said legs are inclined at an angle of from about 10° to about 20° from a longitudinal plane normal to the respective partition walls.

7. The conduit section of claim 5 wherein said angle is 15°.

8. The conduit section of claim 4 wherein said projecting partition wall portions project within said female portion defining means.

9. The conduit section of claim 4 wherein said partition walls increase in cross-section toward said enclosing walls.

10. The conduit section of claim 4 wherein said male portion includes a circumferentially extending flange spaced from the free end thereof, the outer transverse dimensions of said flange corresponding to the inner transverse dimensions of said female portion at a section near the free end thereof, whereby said flange may support the free end of said female portion of a similar conduit when said male portion is inserted therein.

11. The conduit section of claim 4 wherein the inner transverse dimensions of said female portion are generally larger than the external transverse dimensions of said male portion to permit limited angular displacement of adjacent connected sections.

12. The conduit section of claim 4 wherein the outer transverse dimensions at the free end of said male portion equal the inner transverse dimensions of said female portion at a section opposite the free end thereof, whereby said male portion free end may support a female portion of a similar conduit section when inserted therein.

13. The conduit section of claim 4 wherein said male portion includes an outwardly tapered portion having a circumferentially extending groove therein, and a resilient sealing gasket having a rib corresponding in shape to said groove at its inside face, said gasket being carried on said tapered male portion with said rib positioned in said groove, whereby said gasket provides sealing engagement between said male portion and a female portion of an adjacent similar conduit section.

14. The conduit section of claim 13 wherein said gasket is provided with a plurality of circumferentially extending, spaced apart continuous ribs on the other surface for engaging the inner portion of the female portion of an adjacent conduit section thereby to increase the sealing effect therebetween.

15. The conduit section of claim 4 wherein said female portion includes circumferentially disposed gussets for reinforcing the junction between said female portion and said wall means.

16. The conduit section of claim 4 wherein said section has a flange adjacent said male portion and said female portion includes a surface generally perpendicular to said wall means; and a plurality of spring clips, said clips being engageable with said flange and the perpendicular surface of an adjacent similar section for securing the sections together.

17. The conduit section of claim 16 wherein each said spring clips comprise an elongated portion bent at a given angle for spanning the joint between conduit sections and reversely bent end portions for gripping said flange and said surface.

18. The conduit section of claim 16 wherein said flange has an upper surface tapered at an angle complementary to said spring clip elongated portion whereby a portion of a clip is supported thereon.

19. A light-weight, injection molded plastic conduit section for connection to similar conduit sections comprising: an elongated, generally rectangular-shaped enclosing wall defining a passage therein; means defining an integral female portion at one end of said enclosing wall; said enclosing wall defining an integral male portion at the other end thereof, the outer transverse dimensions of the free end of said male portion corresponding to the inner transverse dimensions of said female portion at a section opposite the free end thereof; an annular flange adjacent said male portion having outer transverse dimensions equal to the inner transverse dimensions of the free end of said female portion to support said free end thereon; said male portion having a circumferentially extending groove formed therein between said flange and the free end of said male portion; an annular gasket having a rib on its inner surface corresponding in shape to said groove and carried thereon, the outer surface of said gasket being engageable with the inner surface of a female portion of an adjacent similar conduit section and an edge of said gasket abutting said flange to facilitate positioning of said gasket on said male portion; and longitudinally extending, transversely disposed partition walls integral with said enclosing wall for dividing said passage into a plurality of longitudinally extending passageways, said partition walls projecting outwardly into said female portion to provide integral generally U-shaped projections with inclined bearing surfaces and being correspondingly recessed at the male portion of said section, said partition walls being tapered outwardly toward said enclosing wall, whereby said projections and recesses provide column-like support in combination with said flange and the free end of said male portion to support the joint between connected similar conduit sections under shear loading.

* * * * *

UNITED STATES PATENT OFFICE
CERTIFICATE OF CORRECTION

PATENT NO. : 3,872,894
DATED : March 25, 1975
INVENTOR(S) : Kenneth F. Streit

It is certified that error appears in the above-identified patent and that said Letters Patent are hereby corrected as shown below:

Change the Assignee from "3-D Ducts, Inc." to read

-- Phone-Ducs, Inc. --

Signed and Sealed this fourteenth Day of October 1975

[SEAL]

Attest:

RUTH C. MASON
Attesting Officer

C. MARSHALL DANN
Commissioner of Patents and Trademarks